UNITED STATES PATENT OFFICE.

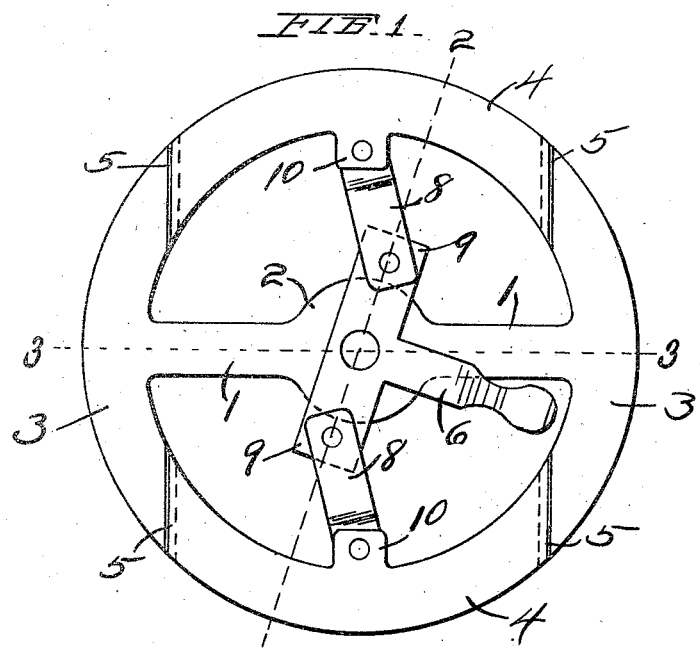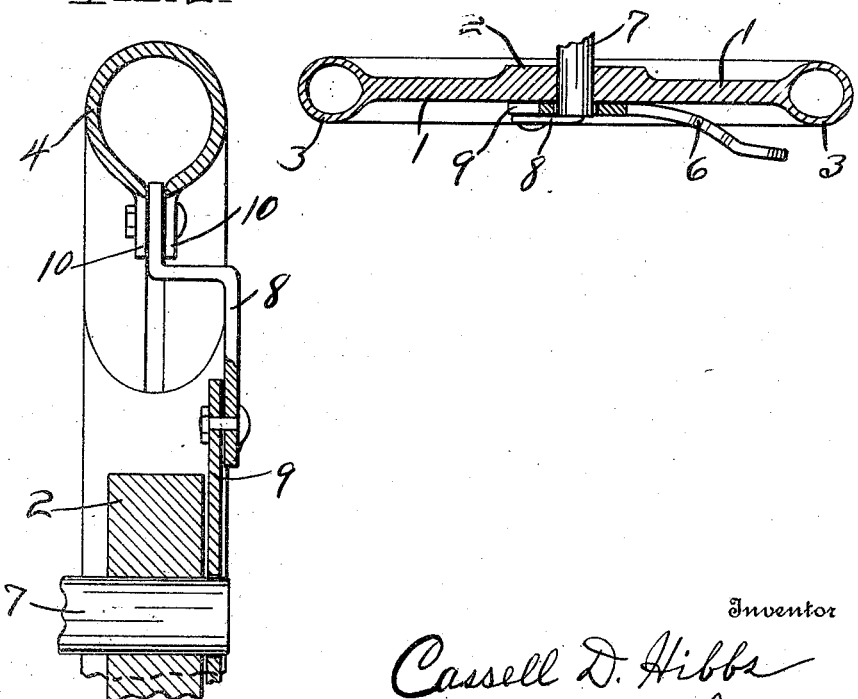

CASSELL D. HIBBS, OF FORT WORTH, TEXAS.

CORE FOR TIRE-CASINGS.

1,300,391.      Specification of Letters Patent.      Patented Apr. 15, 1919.

Application filed November 5, 1918. Serial No. 261,186.

*To all whom it may concern:*

Be it known that I, CASSELL D. HIBBS, a citizen of the United States of America, residing at Fort Worth, in the county of Tarrant and State of Texas, have invented certain new and useful Improvements in Cores for Tire-Casings, of which the following is a specification.

My invention relates to a collapsible core for rebuilding tire casings; and the object is to provide a simple device for practical use in rebuilding tire casings and which may also be used in the manufacture of tire casings and from which the tire casings can be easily removed without breaking the beads off of the casings.

Other objects and advantages will be fully explained in the following description and the invention will be more particularly pointed out in the claims.

Reference is had to the accompanying drawings which form a part of this application.

Figure 1 is a side elevation of the core. Fig. 2 is a broken radial section, taken on the line 2—2 of Fig. 1. Fig. 3 is a radial section taken on the line 3—3 of Fig. 1.

The improved core has a stationary frame which carries parts of the circular members. The frame portion includes a bar 1 which has a hub portion 2 which serves as a means for mounting the core. The bar 1 carries segments 3 of the core integral with the bar 1. The segments 3 are permanently stationary. Movable segments 4 make up the remaining portions of the core. The members 4 are movable radially and provision is made for moving the members 4 for the purpose of mounting and removing the tire casings. The members are joined to the members 3 by tongue and groove joints 5. A double armed lever 6 is fulcrumed on the supporting frame 7. The frame 7 is provided and the part 2 is rigid with the frame 7 and the lever 6 is loosely mounted on the end of the frame 7 which is prepared to form a fulcrum or pivot for the lever 6. Link bars 8 are pivotally connected to the arms 9 of the lever 6 and pivotally connected to lugs 10 which are integral with the segments 4.

With the lever 6, the segments 4 can be drawn far enough inwardly to mount a tire casing and then thrown outwardly to complete a circular core. After the casing is formed, the segments 4 can be drawn inwardly far enough for easily removing the casing from the members 3 of the core. The members 3 remain stationary with the supporting frame member 7.

What I claim is,—

1. A collapsible tire core comprising a circular form consisting of two stationary segments and two movable segments loosely connected together, said movable segments having inwardly projecting lugs, a double armed lever fulcrumed on said stationary members, and link bars pivotally conected to the arms of said lever and to said lugs.

2. A collapsible tire core comprising a circular form having a stationary hub and two segments integral with the hub and two segments movable relative to said integral segments, tongue and groove joints loosely connecting said movable segments to said integral segments, said movable members having inwardly projecting lugs and said hub having a fulcrum on one side thereof, a double armed lever pivoted on said fulcrum, and link bars pivotally connected at their inner ends to the arms of said lever and offset at their outer ends and pivotally connected to said lugs.

In testimony whereof, I set my hand, this 31st day of October, 1918.

CASSELL D. HIBBS.